US008469560B2

(12) United States Patent
Tarr et al.

(10) Patent No.: US 8,469,560 B2
(45) Date of Patent: Jun. 25, 2013

(54) LIGHT WITH ALIGNMENT FEATURE

(75) Inventors: Jeremy R Tarr, Somerville, TN (US);
Daniel P Edwards, Cordova, TN (US)

(73) Assignee: Hunter Fan Company, Memphis, TN (US)

( * ) Notice: Subject to any disclaimer, the term of this patent is extended or adjusted under 35 U.S.C. 154(b) by 338 days.

(21) Appl. No.: 12/960,795

(22) Filed: Dec. 6, 2010

(65) Prior Publication Data

US 2012/0140493 A1 Jun. 7, 2012

(51) Int. Cl.
*F21S 8/06* (2006.01)

(52) U.S. Cl.
USPC ............................... 362/404; 362/408; 416/5

(58) Field of Classification Search
USPC ...................................... 362/404, 408; 416/5
See application file for complete search history.

(56) References Cited

U.S. PATENT DOCUMENTS

| 4,831,505 | A | 5/1989 | Van Norman |
| 5,655,880 | A | 8/1997 | Su et al. |
| 6,062,816 | A | 5/2000 | Chang |
| 6,086,226 | A | 7/2000 | Chang |
| 6,089,725 | A | 7/2000 | Chen |
| 6,494,589 | B1 * | 12/2002 | Shyu ............................... 362/96 |
| 6,682,303 | B2 | 1/2004 | Wu |
| 6,733,159 | B1 | 5/2004 | Wu |
| 6,793,525 | B2 | 9/2004 | Wu |
| 7,150,544 | B2 | 12/2006 | Pearce et al. |
| 7,757,369 | B2 | 7/2010 | Kassay et al. |

FOREIGN PATENT DOCUMENTS

FR 2525298 10/1983

* cited by examiner

*Primary Examiner* — Sean Gramling
(74) *Attorney, Agent, or Firm* — Baker Donelson; Dorian B. Kennedy

(57) ABSTRACT

A light (10) includes a mounting bracket (17) including a top plate (18), a pair of arms (19), and an inner cap (20). The inner cap has a central D-shaped mounting hole (21) and an offset pull chain passage hole (22). A hollow D-shaped nipple (25) is positioned within the D-shaped mounting hole. The light also includes a light diffusor (34) and an outer cap having a central D-shaped mounting hole (37) journalled upon the D-shaped nipple and an offset pull chain passage hole (38). The ceiling fan includes a motor having a pull chain which passes through the pull chain passage holes. Lastly, a hollow finial (40) is threaded onto the nipple to a position abutting the bottom of the outer cap so as to lock the position of the light diffusor and outer cap. The D-shape of the nipple and surrounding mounting holes prevent the nipple from rotating relative to the inner and outer caps.

10 Claims, 4 Drawing Sheets

LIGHT WITH ALIGNMENT FEATURE

TECHNICAL FIELD

This invention relates to lights and particularly to lights and ceiling fan light kits that have operational pull chains.

BACKGROUND OF THE INVENTION

Currently, the bottom of ceiling mounted lights and ceiling fan light kits oftentimes include a light diffusor or bowl which is mounted to the ceiling or ceiling fan through a threaded rod. The customer typically must hold the bowl up, feed the pull chains through a cap mounted below the bowl, and tighten a finial mounted below the cap in order to hold the bowl in place. This mounting process requires that the customer keep the cap aligned to prevent the pull chain from binding up or wrapping itself around the threaded rod. It also requires the threaded rod to be held tightly to the rest of the light or light kit (typically using an adhesive and/or a knurling feature) to keep it from being unscrewed if the finial is ever loosened.

Accordingly, it is seen that a need remains for a light having a pull chain wherein the light diffusor may be mounted quickly and easily mounted to a motor. It is to the provision of such therefore that the present invention is primarily directed.

SUMMARY OF THE INVENTION

A light comprises an inner cap having a select non-circular shaped mounting hole and a pull chain passage hole spaced from the inner cap mounting hole; a non-circular shaped nipple having a size and shape adapted to conform with and fit within the inner cap non-circular shaped mounting hole, the non-circular shaped nipple being mounted within the inner cap non-circular shaped mounting hole; a light diffusor positioned adjacent the inner cap, the light diffusor having a mounting hole through which the nipple extends; an outer cap positioned adjacent the light diffusor, the outer cap having a non-circular shaped mounting hole sized and shaped to conform with and receive the non-circular nipple, the outer cap also having a pull chain passage hole spaced from the outer cap mounting hole; a finial positioned adjacent the outer cap opposite the light diffusor, the finial being coupled to the nipple, and a light device having at least one light socket and a light switch.

DETAILED DESCRIPTION

Figure 1:
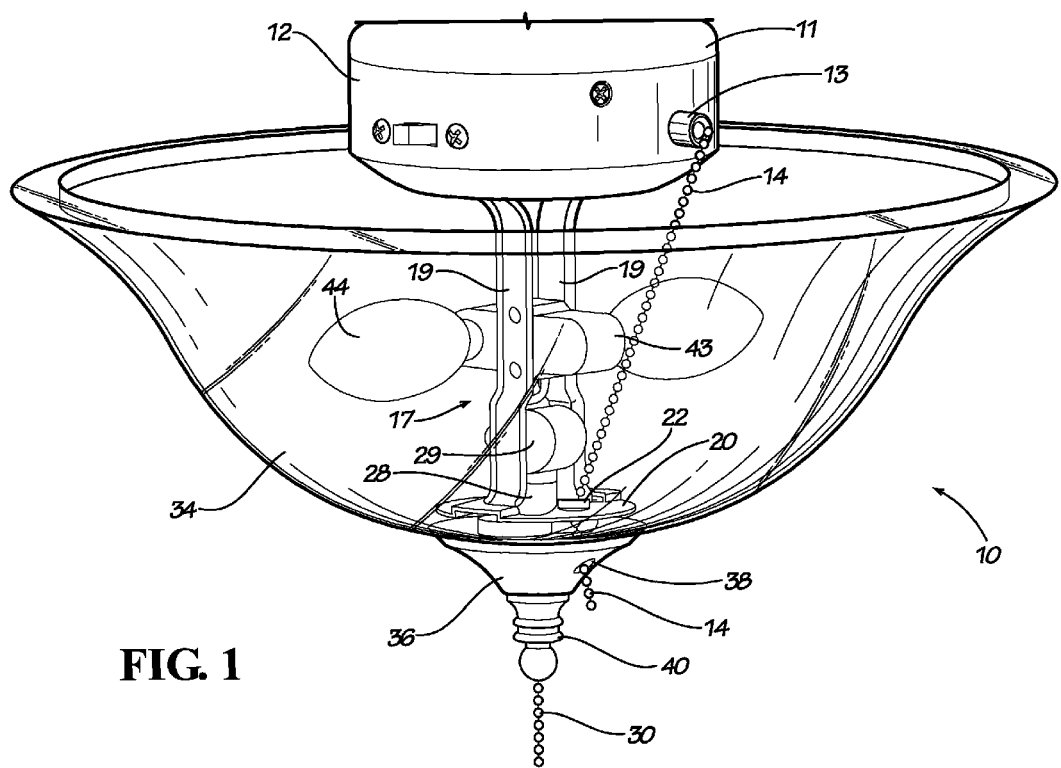
FIG. 1 is a perspective view of a ceiling fan light kit embodying principles of the invention in a preferred form.
Figure 2:
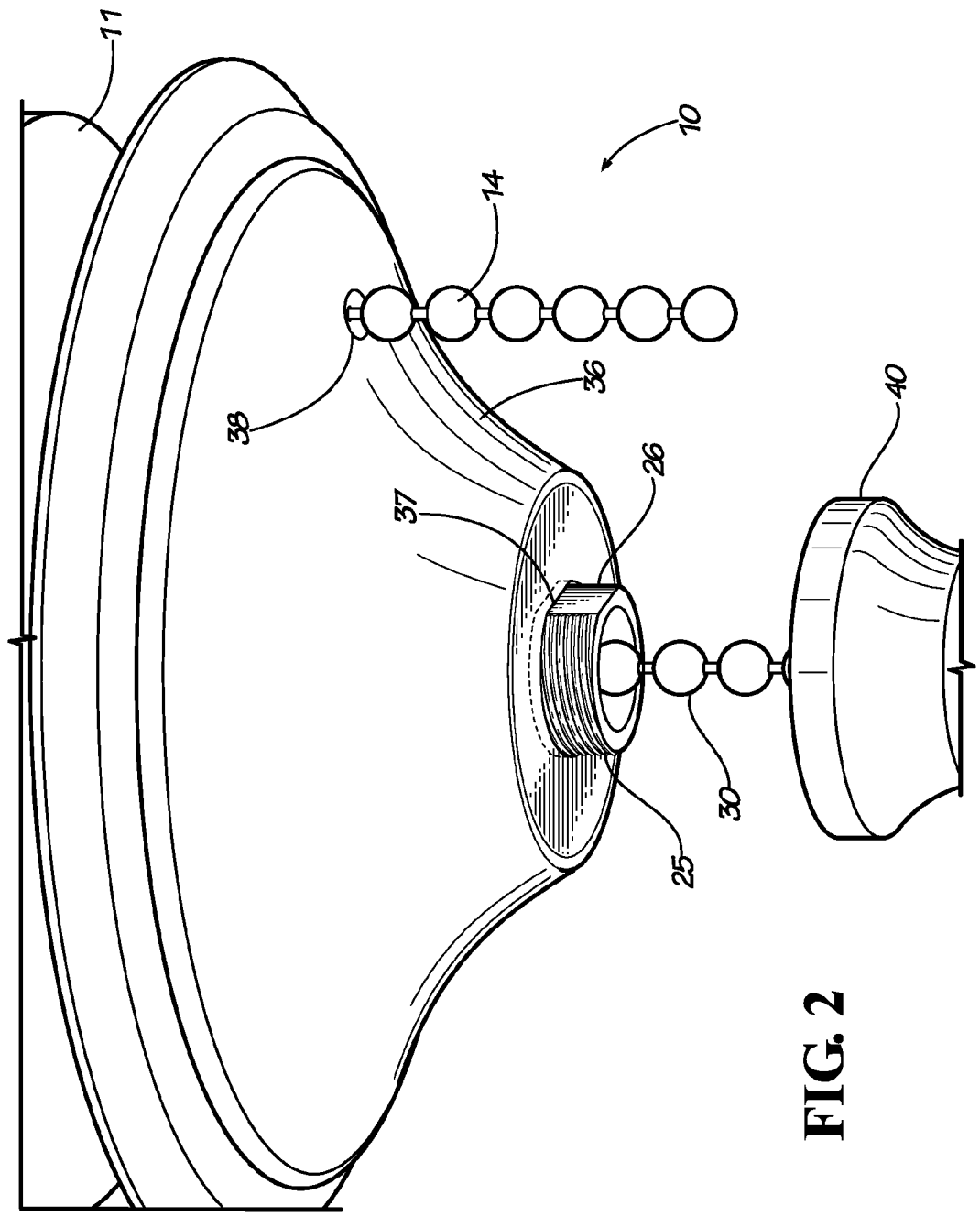
FIG. 2 is a perspective view of a portion of the light kit of FIG. 1.
Figure 3:
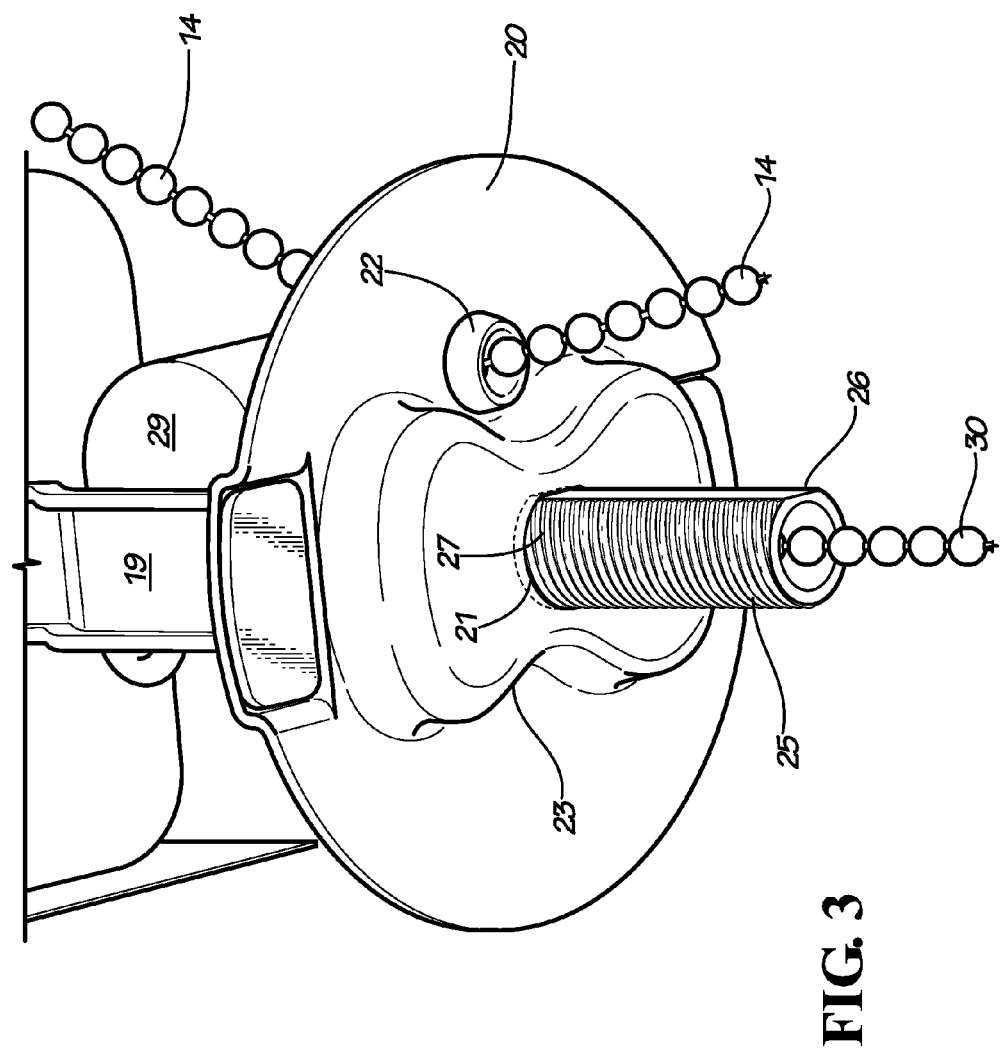
FIG. 3 is a perspective view of a portion of the light kit of FIG. 1.
Figure 4:
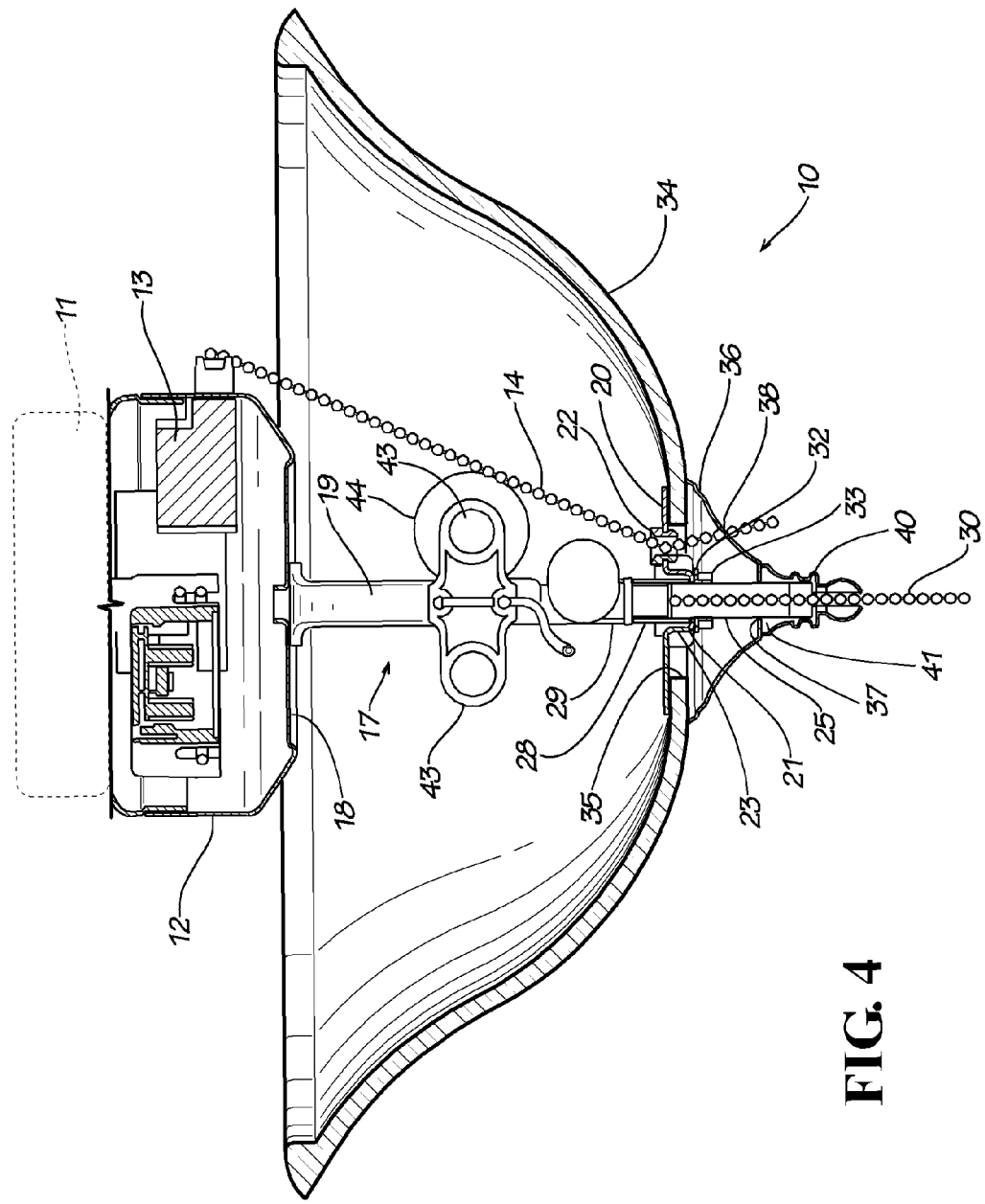
FIG. 4 is a cross-sectional view of the light kit of FIG. 1.

With reference next to the drawings, there is shown a light 10 embodying principles of the invention in a preferred form, shown in the drawings in the form of a ceiling fan light or light kit. The preferred embodiment is shown mounted to a conventional ceiling fan 11 which includes a conventional switch housing 12 containing a ceiling fan actuation switch 13 having an elongated pull chain 14. However, it should be understood that the mounting bracket 11 may be configured to mount to a ceiling junction box if utilized as a ceiling light.

The actuation or pulling of the ceiling fan pull chain 14, and thus the actuation of the actuation switch 13, controls the operation of the ceiling fan motor.

The light 10 includes a mounting bracket 17 which is configured to mate with the bottom of the ceiling fan switch housing 12. The mounting bracket 17 includes a top plate 18 which is configured to mate with the ceiling fan switch housing 12, a pair of bracket members or arms 19 depending from the top plate 18, and a bottom plate or inner cap 20 coupled to the bottom of the arms 19 opposite the top plate 18. The inner cap 20 has an inverted, raised plateau 23 with a central D-shaped mounting hole 21, and an offset pull chain passage hole 22 therein configured to allow the passage of the ceiling fan actuation switch pull chain 14. A hollow D-shaped threaded pipe or nipple 25 having an upper mounting end 27 is positioned within the D-shaped mounting hole 21. The D-shaped nipple 25 is actually round in shape except for the presence of an elongated flat portion or facet 26 which renders the shape non-circular or non-round, which is also true for the D-shaped mounting holes described herein. A knurled, hollow, internally threaded tube 28 is threaded onto the upper end of the D-shaped nipple 25 above the inner cap 20. Similarly, a light switch 29 is threaded into the upper end of the threaded tube 28 so that a light switch pull chain 30 associated with the light switch 29 extends through the center of the hollow tube 28 and hollow nipple 25. A washer 32 is journalled onto and a lock nut 33 is threaded onto the D-shaped nipple 25 below the inner cap 20 to lock the D-shaped nipple 25 in place relative to the inner cap 20. The D-shape, flat portion 26, or non-circular shape of the nipple 25 and surrounding mounting hole 21 prevents the nipple 25 from rotating relative to the inner cap 20.

The light 10 also includes a transparent or translucent light diffusor 34 with a preferably round central mounting hole 35 therethrough, shown in the preferred embodiment as a bowl shaped light diffusor but may be in the form of any conventional light kit, such as those having a central hub from which extends a plurality of arms. The central mounting hole 35 is of a size that includes the offset, inner cap pull chain passage hole 22 once the diffusor is positioned centrally against the inner cap 20. The inner cap plateau 23 aids in seating or centering the diffusor central mounting hole 35 against the inner cap 20.

An outer cap 26 has a central D-shaped mounting hole 37 journalled upon the D-shaped nipple 25 to a position below the light diffusor 34. The outer cap 36 also includes an offset pull chain passage hole 38 through which extends the ceiling fan actuation switch pull chain 14. Lastly, a hollow finial 40 is threaded onto the bottom end of the D-shaped nipple 25 to a position abutting the bottom of the outer cap 36 so as to lock the position of the light diffusor 34 and outer cap 36. The hollow finial 40 has a central channel 41 through which extends the light switch pull chain 30.

A light device 42 in the form of a pair of light sockets 43 is coupled to the mounting bracket 17. Each light socket 43 has an light bulb 44 mounted therein. The light device is electrically coupled to electrical wires residing within the ceiling junction box or within the switch housing 12 of a ceiling fan.

In use, the light 10 is mounted to the ceiling fan 11 by coupling the mounting bracket top plate 18 to the bottom of the ceiling fan switch housing 12 in a conventional manner. The light switch 29 is electrically wired to the pre-existing wires contained within the ceiling fan switch housing 12 to provide power to the light switch 29 and therethrough to the light sockets 43 and light bulbs 44. The light switch pull chain 30 passes through the threaded tube 28, nipple 25, washer 32, and lock nut 33. Similarly, the ceiling fan actuation switch pull chain 14 is threaded through pull chain passage hole 22 of the inner cap 20.

Next, the installer or operator raises the light diffusor 34 so that the nipple 25 passes through the light diffusor central mounting hole 35. The light diffusor 34 should be raised until it abuts the inner cap 20. While holding the light diffusor 34 in substantially this position, the operator then raises the outer cap so that the nipple 25 passes through the outer cap D-shaped hole 37 and the actuation switch pull chain 14 passes through chain passage hole 38. The light switch pull chain 30 is then passed through finial outer channel 41 and the finial 40 is threaded onto the bottom end of the nipple 25 until it fits snugly against the bottom of the light diffusor 35.

It should be understood that the threading motion of the finial does not cause rotation of the nipple 25, as the flat portion 26 of the nipple against the similarly shaped D-shaped mounting hole 21 (flat portion) prevents relative rotation between these two items, i.e., the non-round or D-shaped nipple and corresponding mounting hole 21 does not allow for relative rotation therebetween. The prevention of nipple rotation during the installation process provides great benefits which include the benefit that the actuation switch pull chain 14 does not wrap itself around the bracket during rotation of the finial or light diffusor. Additionally, this prevents the nipple 25 from becoming threaded too far into the bracket 17 resulting in the shortening of the length of the nipple below the bracket to a length which prevents the finial from being threaded onto the nipple. Similarly, by preventing rotation of the nipple, the nipple is not accidentally unthreaded or removed from the bracket during the unthreading of the finial.

It should be understood, that the light of the present invention may be a ceiling mounted light. In such an embodiment, the light switch pull chain would extend through the offset pull chain passage hole 22 of the inner cap rather than through mounting hole 21. This would allow the light pull chain to be located in a position other than through the finial.

It should be understood that the D-shaped mounting hole and nipple may be of other mutually conforming shapes, such as one having two opposite flat portions or facets, so long as they are both non-round or non-circular configuration which prevents relative rotation therebetween.

It should be understood that the term pull chain or pull chord is intend to encompass any generally flexible, elongated structure, such as strings, cords, cables, unified links, etc.

It should also be understood that the nipple may include one or more non-circular portions rather than being non-circular along its entire length. The non-circular portions would coincide with one of more of the non-circular mounting holes so as to prevent rotational movement between components.

Lastly, it should be understood that the light diffusor may include an integrated outer cap or that the light diffusor is in the form of an outer cap alone, such as a light diffusor having a central hub (outer cap) from which extends a plurality of arms having light sockets.

It thus is seen that a light is now provided which overcomes problems associated with lights of the prior art. While this invention has been described in detail with particular references to the preferred embodiments thereof, it should be understood that many modifications, additions and deletions, in addition to those expressly recited, may be made thereto without departure from the spirit and scope of the invention.

The invention claimed is:

1. A light comprising,
   an inner cap having a select non-circular shaped mounting hole and a pull chain passage hole spaced from said inner cap mounting hole;
   a non-circular shaped nipple having a size and shape adapted to conform with and fit within said inner cap non-circular shaped mounting hole, said non-circular shaped nipple being mounted within said inner cap non-circular shaped mounting hole;
   a light diffusor positioned adjacent said inner cap, said light diffusor having a mounting hole through which said nipple extends;
   an outer cap positioned adjacent said light diffusor, said outer cap having a non-circular shaped mounting hole sized and shaped to conform with and receive said non-circular nipple, said outer cap also having a pull chain passage hole spaced from said outer cap mounting hole;
   a finial positioned adjacent said outer cap opposite said light diffusor, said finial being coupled to said nipple, and
   a light device having at least one light socket and a light switch.

2. The light of claim 1 further comprising a plate adapted to be mounted to a ceiling fan and at least one member extending between said plate and said inner cap.

3. The light of claim 2 wherein said nipple and said finial are hollow, wherein said light device light switch includes an elongated pull chain extending through said inner cap pull chain passage hole and said outer cap pull chain passage hole.

4. A light for a ceiling fan having a motor and an actuation switch with a pull chain, the light comprising:
   a mounting bracket having an inner cap having a nipple mounting hole and an offset pull chain passage hole through which the ceiling fan motor actuation switch pull chain may extend;
   a hollow nipple defining a nipple internal channel, said nipple having a lower end and an upper end coupled to said mounting bracket, and at least a portion having a non-circular shape;
   a light diffusor having a mounting hole through which said nipple extends;
   an outer cap having a non-circular shaped mounting hole sized and shaped to conform with and receive said non-circular portion of said nipple, said outer cap also having an offset pull chain passage hole through which the ceiling fan motor actuation switch pull chain may extend;
   a hollow finial defining a finial internal channel, said finial being coupled to said lower end of said nipple, and
   a light device having at least one light socket and a light switch having a light switch pull chain, said light switch pull chain extending through said nipple internal channel and said finial internal channel.

5. The light of claim 4 wherein said inner cap nipple mounting hole has a non-circular shaped adapted to receive said non-circular portion of said nipple.

6. The light of claim 4 wherein said bracket further includes a plate adapted to be mounted to a ceiling fan and at least one member extending between said plate and said inner cap.

7. A light for a ceiling fan having a motor and an actuation switch with a pull chain, the light comprising:
   a mounting bracket having an inner cap having an offset pull chain passage hole through which the ceiling fan motor actuation switch pull chain may extend;

a nipple coupled to said inner cap and having a nipple internal channel, said nipple having a portion with a select configuration;

a light diffusor having an outer cap with a mounting hole, said outer cap also having an offset pull chain passage hole through which the ceiling fan motor actuation switch pull chain may extend, said outer cap having a nipple mounting hole having a configuration corresponding to said nipple portion select configuration to prevent rotational movement therebetween;

a finial having a finial internal channel, said finial being coupled to a lower end of said nipple, and a light device having at least one light socket and a light switch having a light switch pull chain, said light switch pull chain extending through said nipple internal channel and said finial internal channel.

8. The light of claim 7 wherein said inner cap has a nipple mounting hole having a configuration corresponding to said nipple portion select configuration to prevent rotational movement therebetween.

9. The light of claim 7 wherein said bracket further includes a plate adapted to be mounted to a ceiling fan and at least one member extending between said plate and said inner cap.

10. The light of claim 7 wherein said light diffusor includes a bowl shaped structure positioned between said outer cap and said inner cap.

* * * * *